US010988659B2

(12) United States Patent
Mohammed et al.

(10) Patent No.: US 10,988,659 B2
(45) Date of Patent: Apr. 27, 2021

(54) LAYERED DOUBLE HYDROXIDES FOR OIL-BASED DRILLING FLUIDS

(71) Applicants: Saudi Arabian Oil Company, Dhahran (SA); Durham University, Durham (GB); M-I Drilling Fluids UK Ltd, Aberdeen (GB)

(72) Inventors: Musarrat Halima Mohammed, Glasgow (GB); Andrew Whiting, Durham (GB); Hugh Christopher Greenwell, County Durham (GB); Manohara Gudiyor Veerabhadrappa, Durham (GB); John Adrian Hall, Dhahran Hills (SA); Gasan Selman Alabedi, Cheshire (GB); Michael Hayward Hodder, Aberdeen (GB)

(73) Assignees: Saudi Arabian Oil Company, Dhahran (SA); Durham University, Durham (GB); M-I Drilling Fluids UK Ltd, Aberdeen (GB)

( * ) Notice: Subject to any disclaimer, the term of this patent is extended or adjusted under 35 U.S.C. 154(b) by 0 days.

(21) Appl. No.: 16/057,367

(22) Filed: Aug. 7, 2018

(65) Prior Publication Data
US 2019/0055450 A1 Feb. 21, 2019

Related U.S. Application Data

(60) Provisional application No. 62/545,663, filed on Aug. 15, 2017.

(51) Int. Cl.
*C09K 8/36* (2006.01)
*E21B 21/14* (2006.01)
*E21B 21/00* (2006.01)

(52) U.S. Cl.
CPC .............. *C09K 8/36* (2013.01); *E21B 21/003* (2013.01); *E21B 21/14* (2013.01)

(58) Field of Classification Search
None
See application file for complete search history.

(56) References Cited

U.S. PATENT DOCUMENTS

| | | |
|---|---|---|
| 22,848 A | 2/1859 | Saml |
| 2,520,551 A | 8/1950 | Kilgore |
| 3,125,517 A | 3/1964 | Voda |
| 3,166,548 A | 1/1965 | Kirkpatrick et al. |
| 3,539,518 A | 11/1970 | Feighner et al. |
| 3,600,121 A | 8/1971 | Feldmann |
| 3,676,344 A | 7/1972 | Kuceski |
| 3,723,393 A | 3/1973 | Kistner |
| 3,728,277 A | 4/1973 | Foley |
| 4,368,276 A | 1/1983 | Park |
| 4,374,737 A | 2/1983 | Larson et al. |
| 4,501,672 A | 2/1985 | Connell et al. |
| 4,664,843 A | 5/1987 | Burba, III et al. |
| 4,749,563 A | 6/1988 | Georgalas |
| 4,766,153 A | 8/1988 | Casciani |
| 4,776,966 A * | 10/1988 | Baker ...................... C09K 8/36 507/117 |
| 5,079,203 A | 1/1992 | Pinnavaia et al. |
| 5,094,778 A | 3/1992 | Burba, III et al. |
| 5,196,143 A | 3/1993 | Burba, III et al. |
| 5,250,727 A | 10/1993 | Fried |
| 5,325,922 A | 7/1994 | Cowan et al. |
| 5,709,976 A | 1/1998 | Malhotra |
| 5,869,433 A | 2/1999 | Patel |
| 5,874,024 A | 2/1999 | Knaus |
| 6,172,151 B1 | 1/2001 | Johnston et al. |
| 6,242,389 B1 | 6/2001 | Elliott et al. |
| 6,365,639 B1 | 4/2002 | Hoy |
| 6,395,686 B2 | 5/2002 | Crawford |
| 6,437,031 B1 | 8/2002 | Lensvelt et al. |
| 6,475,959 B1 | 11/2002 | Lange et al. |
| 6,537,662 B1 | 3/2003 | Kamrath et al. |
| 6,878,198 B1 | 4/2005 | Drappel et al. |
| 6,894,007 B2 | 5/2005 | Klug et al. |
| 7,098,351 B2 | 8/2006 | Hoong et al. |
| 7,278,726 B2 | 10/2007 | Nagai |
| 7,507,694 B2 * | 3/2009 | Shumway ............... C09K 8/265 507/118 |
| 7,741,248 B2 | 6/2010 | Mueller et al. |
| 8,071,510 B2 | 12/2011 | Scoggins et al. |
| 8,501,807 B2 | 8/2013 | You et al. |

(Continued)

FOREIGN PATENT DOCUMENTS

| | | |
|---|---|---|
| CA | 2057024 A1 | 11/1990 |
| CN | 103032056 A | 4/2013 |

(Continued)

OTHER PUBLICATIONS

Liang et al. "Direct Synthesis of Unilamellar MgAl-LDH Nanosheets and Stacking in Aqueous Solution" Langmuir 2015, 31, 45, 12464-12471: (Year: 2015).*
Constantino et al. "Basis Properties of Mg2+1-x layered Double Hydroxides Intercalated by Carbonate, Hydroxide, Chloride and Sulfate Anions" (Year: 1994).*
Search Report pertaining to International Patent Application PCT/US2018/046204 dated Oct. 31, 2018.
Search Report pertaining to International Patent Application PCT/US2018/046009 dated Oct. 31, 2018.
Search Report pertaining to International Patent Application PCT/US20181045569 dated Oct. 25, 2018.
Search Report pertaining to International Patent Application PCT/US2018/045907 dated Nov. 27, 2018.

(Continued)

*Primary Examiner* — Charles R Nold
(74) *Attorney, Agent, or Firm* — Dinsmore & Shohl LLP

(57) ABSTRACT

A method of preparing and a composition of an oil-based drilling fluid. An oil-based drilling fluid includes a base oil continuous phase, in which the base oil continuous phase includes a base oil, an aqueous dispersed phase, and at least one rheology modifier comprising a modified magnesium/aluminum carbonate layered-double hydroxide (Mg/Al—$CO_3$ LDH) compound.

12 Claims, No Drawings

(56) References Cited

U.S. PATENT DOCUMENTS

| | | |
|---|---|---|
| 9,222,013 B1 | 12/2015 | Champagne et al. |
| 9,315,621 B2 | 4/2016 | Chen et al. |
| 9,815,222 B2 | 11/2017 | James et al. |
| 2002/0009564 A1 | 1/2002 | Hall et al. |
| 2002/0039666 A1 | 4/2002 | Nakamura |
| 2003/0009834 A1 | 1/2003 | Ascione et al. |
| 2003/0130132 A1 | 7/2003 | Grainger et al. |
| 2003/0130135 A1 | 7/2003 | Hou et al. |
| 2004/0038892 A1 | 2/2004 | Finn et al. |
| 2005/0048024 A1 | 3/2005 | Looker et al. |
| 2006/0035999 A1 | 2/2006 | Bedford et al. |
| 2006/0068086 A1 | 3/2006 | Reece et al. |
| 2006/0088657 A1 | 4/2006 | Reece et al. |
| 2006/0293192 A1 | 12/2006 | Lochel et al. |
| 2007/0034825 A1 | 2/2007 | Wenderoth et al. |
| 2007/0049500 A1 | 3/2007 | Mueller et al. |
| 2007/0100040 A1 | 5/2007 | Chen et al. |
| 2007/0116909 A1 | 5/2007 | Tweed et al. |
| 2007/0140957 A1 | 6/2007 | Mohanty et al. |
| 2007/0227404 A1 | 10/2007 | Plank et al. |
| 2007/0265171 A1 | 11/2007 | Javora et al. |
| 2008/0170978 A1 | 7/2008 | Duan et al. |
| 2008/0182468 A1 | 7/2008 | Dharmarajan et al. |
| 2010/0056647 A1 | 3/2010 | Graham et al. |
| 2010/0279848 A1 | 11/2010 | Iyi et al. |
| 2011/0076607 A1 | 3/2011 | Sugimoto et al. |
| 2012/0067575 A1 | 3/2012 | Luyster et al. |
| 2012/0129735 A1 | 5/2012 | Dino et al. |
| 2012/0149805 A1 | 6/2012 | Elmore et al. |
| 2012/0322694 A1 | 12/2012 | Monteiro et al. |
| 2012/0325748 A1 | 12/2012 | Kasher et al. |
| 2013/0035412 A1 | 2/2013 | Schmitz et al. |
| 2013/0045898 A1 | 2/2013 | Witters et al. |
| 2013/0267445 A1 | 10/2013 | Hendrickson |
| 2014/0081045 A1 | 3/2014 | Reddington et al. |
| 2014/0121135 A1 | 5/2014 | Gamage et al. |
| 2014/0228269 A1 | 8/2014 | Masui et al. |
| 2014/0231145 A1* | 8/2014 | Kverel .................. C09K 8/032 175/65 |
| 2014/0255378 A1 | 9/2014 | Watkins et al. |
| 2014/0284057 A1 | 9/2014 | Champagne et al. |
| 2014/0329088 A1 | 11/2014 | Friedman et al. |
| 2014/0338911 A1 | 11/2014 | Dismuke et al. |
| 2015/0068755 A1 | 3/2015 | Hill et al. |
| 2015/0175880 A1 | 6/2015 | Parris et al. |
| 2015/0210914 A1 | 7/2015 | Muller et al. |
| 2015/0361325 A1* | 12/2015 | Kimura .................. C09K 8/265 166/305.1 |
| 2015/0376490 A1 | 12/2015 | Dino et al. |
| 2016/0031910 A1 | 2/2016 | Maury et al. |
| 2016/0096989 A1 | 4/2016 | Ngantung et al. |
| 2016/0138349 A1 | 5/2016 | Hale et al. |
| 2016/0264847 A1 | 9/2016 | Weerasooriya et al. |
| 2017/0037296 A1 | 2/2017 | Kimura et al. |
| 2017/0044421 A1 | 2/2017 | Parvulescu et al. |
| 2017/0081580 A1 | 3/2017 | Maghrabi et al. |
| 2019/0053993 A1 | 2/2019 | Wilson et al. |
| 2019/0055446 A1 | 2/2019 | Al Batal et al. |
| 2019/0055447 A1 | 2/2019 | Al Batal et al. |
| 2019/0055460 A1 | 2/2019 | Mohammed et al. |

FOREIGN PATENT DOCUMENTS

| | | |
|---|---|---|
| CN | 105623629 A | 6/2016 |
| EP | 0047370 A1 | 3/1982 |
| EP | 396983 A1 | 11/1990 |
| EP | 839850 A2 | 5/1998 |
| EP | 0906969 A1 | 9/1998 |
| EP | 945244 A1 | 9/1999 |
| JP | H022848 A | 1/1990 |
| RU | 2231534 C2 | 6/2004 |
| WO | 9523823 A1 | 9/1995 |
| WO | 0012458 A1 | 3/2000 |
| WO | 01/49406 A1 | 7/2001 |
| WO | 2004069240 A2 | 8/2004 |
| WO | 2014052510 A1 | 4/2014 |
| WO | 2014102602 A2 | 7/2014 |
| WO | 2015174974 A1 | 11/2015 |
| WO | 2016141968 A1 | 9/2016 |
| WO | 2017055789 A2 | 4/2017 |

OTHER PUBLICATIONS

Costantino U. et al. "Preparation and characterization of hydrotalcite/carboxyadamantane intercalation compounds as fillers of polymeric nanocomposites" Journal of Materials Chemistry, Dec. 22, 2006, pp. 1079-1086, vol. 17, No. 11.

International Search Report and Written Opinion pertaining to International Patent Application PCT/US2018/046220 dated Nov. 27, 2018.

International Search Report and Written Opinion dated Dec. 20, 2018 pertaining to International Patent Application PCT/US2018/046226.

International Search Report and Written Opinion dated Oct. 24, 2018 pertaining to International Patent Application PCT/US2018/045765.

Abdo, et al., "Clay nanoparticles modified drilling fluids for drilling of deep hydrocarbon wells", Applied Clay Science, vol. 86, pp. 76-82, 2013.

Abdou, et al., "Evaluation of Egyptian bentonite and nano-bentonite as drilling mud", Egyptian Journal of Petroleum, vol. 22, pp. 53-59, 2013.

Al-Salihi, "Synthesis of layered double hydroxide and their application in DSC", International Journal of Scientific & Engineering Research, vol. 7, Issue 1, pp. 694-698, Jan. 2016.

Askinadze et al., "Engineering of new crosslinked functional PEG micrometer-sized particles of narrow size distribution for enzyme immobilization", Polymer 54, pp. 2926-2934, 2013.

Ayawei et al., "Synthesis, Characterization and Application of Mg/Al Layered Double Hydroxide for the Degration of Congo Red in Aqueous Solution", Open Journal of Physical Chemistry, vol. 5, pp. 55-70, 2015.

Baruah et al., "The effect of particle size of clay on the viscosity build up property of mixed metal hydroxides (MMH) in the low solid-drilling mud compositions", Applied Clay Science, 80-81, pp. 169-175, 2013.

Dardir et al., "Preparton and evaluation of some esteramides as synthetic based drilling fluids", Egyptian Journal of Petroleum, vol. 23, pp. 35-43, 2014.

Oyer et al., "Synthesis and Structure of Phosphatidylinositol Dimannoside", J. Org. Chem., vol. 72, pp. 3282-3288, 2007.

Eissa et al., "Synthesis of nonionic polymeric surfactants with amide oxime terminal groups", Journal of Basic and Environmental Sciences 4, pp. 94-106, 2017.

Fruijtier-Polloth, "Safety assessment on polyethylene glycols (PEGs) and their derivatives as used in cosmetic products", Toxicology 214, pp. 1-38, 2005.

Gluz et al., "Synthesis and characterization of new poly(ethylene glycol)bisphosphonate vinylic monomer and non-fluorescent and NIR-fluorescent bisphosphonate micrometer-sized particles", Polymer 54, pp. 565-571, 2013.

Growcock et al., "The Revolution in Non-Aqueous Drilling Fluids", AADE-11-NTCE-33, presentation at the 2011 AADE National Technical Conference and Exhibition, 2011.

Hermoso, et al., "Influence of viscosity modifier nature and concentratio non the viscous flow behaviour of oil-based drilling fludis at high pressure", Applied Clay Science 87, pp. 14-21, 2014.

Li, et al., "A new type of whole oil-based drilling fluid", Petroleum Exploration and Development, vol. 41, Issue 4, Aug. 2014.

Kim et al., "Thermal Evolution of the Structure of a Mg-A1-Co3 Layered Double Hydroxide: Sorption Reversibility Aspects", Ind. Eng. Chem. Res, vol. 43, pp. 4559-4570, 2004.

Krauss, et al., "Synthesis and Biological Evaluation of New Niphathesine Analogues", Arch. Pharm. Chem. Life Sci., 340, pp. 154-158, 2007.

(56) References Cited

OTHER PUBLICATIONS

Li, et al., "Rheological properties of hydrotalcite-like compounds/montmorillonite suspensions", Colloids and Surfaces A: Physichochem. Eng. Aspects, 304, pp. 14-17, 2007.
Liyi et al., "Effect of Gas Hydrate Drilling Fluids Using Low Solid Phase Mud System in Plateau Permafrost", Procedia Engineering 73, pp. 318-325, 2014.
Mao et al., "Hydrophobic associated polymer based silica nanoparticles composite with core-shell structure as a filtrate reducer for drilling fluid at ultra-high temperature", Journal of Petroleum Science and Engineering 129, pp. 1-14, 2015.
Mizrahi et al., "Novel Poly(ethylene glycol) Monomers Bearing Diverse Functional Groups", j. Polym. Sci., Part A: Polym. Chem. 48, pp. 5468-5478, 2010.
Ning et al., "Gas-hydrate formation, agglomeration and inhibition in oil-based drilling fluids for deep-water drilling", Journal of Natural Gas Chemistry 19, pp. 234-240, 2010.
Pivnicka et al., "Pressure gradient prediction of time-dependent drilling fluids and the effect of acceleration", Journal of Petroleum Science and Engineering 135, pp. 246-252, 2015.
Sakai et al., "Quaternary Ammonium-Type Gemini Surfactants Synthesized from Oleic Acid: Aqueous Solution Properties and Adsorption Characteristics", Journal of Oleo Science, vol. 62, No. 7, pp. 489-498, 2013.
Strachan, "Developing a High-Performance Oil-Base Fluid for Exploration Drilling", Oilfield Review Spring, vol. 26, No. 1, pp. 26-33, 2014.
Stanimirova et al., "Thermal evolution of Mg-A1-CO3 hydrotalcites", Clay Materials, vol. 39, pp. 177-191, 2004.
Tang, Boric Acid Catalyzed Amide Formation From Carboxylic Acids and Amines: N-Benzyl-4-Phenylbutyramide (Benzenbutanamide, N-(phenylmethyl)-), Organic Syntheses, vol. 81, pp. 262-272, 2005.
Traverso-Soto et al., "Distribution of anionic and nonionic surfactants in a sewage-impacted Mediterranean costal lagoon: Inputs and seasonal variations", Science of the Total Environment 503-504, pp. 87-96, 2015.
Vandevoorde et al., "Modifications of the Ethanolamine Head in N-Palmitoylethanolamine: Synthesis and Evaluation of New Agents Interfering with the Metabolism of Anandamide", J. Med. Chem. 46, pp. 1440-1448, 2003.
Vinardell et al., "The relationship between the chain length of non-ionic surfactants and their hemolytic action on human erythrocytes", Comparative Biochemistry and Physiology Part C 124, pp. 117-120, 1999.
Veronese et al., "The Impact of PEGylation of Biological Therapies", Buidrugs, vol. 22, Issue 5, pp. 315-329, 2008.
Wang et al., "New synthetic route to Mg-A1-CO3 layered double hydroxide using magnesite", Materials Research Bulletin 48, pp. 1228-1232, 2013.
Ying, "Fate, behavior and effects of surfactants and their degration products in the environment", Environment International 32, pp. 417-431, 2006.
Yldrim, "Metallic magnesium: an efficient catalyst toward N-aryl and N-alkyl substituted amides directly from aliphatic carboxylic acids", Monatsch Chem 146, pp. 947-951, 2015.
Zamanian et al., "Layered double hydroxides intercalated by long chain anions as oil phase gelling agent", Indian Journal of Chemical Technology, vol. 23, pp. 485-490, Nov. 2016.
Zhong et al., "Synergistic stabilization of shale by a mixture of polyamidomaine dendrimers modified bentonite with various generations in water-based drilling fluid", Applied Clay Science 114, pp. 359-369, 2015.
Zhuang et al., "Comparative study on the use of cationic-nonionic-organo-montmorillonite in oil-based drilling fluids", Applied Clay Science 1160117, pp. 257-262, 2015.
Search Report pertaining to International Patent Application PCT/US2018/045927 dated Oct. 30, 2018.
Office Action dated Sep. 20, 2019 pertaining to U.S. Appl. No. 16/055,881, filed Aug. 6, 2018, 28 pgs.
Office Action dated Sep. 20, 2019 pertaining to U.S. Appl. No. 16/055,867, filed Aug. 6, 2018, 28 pgs.
Office Action dated Sep. 19, 2019 pertaining to U.S. Appl. No. 16/059,558, filed Aug. 9, 2018, 28 pgs.
Office Action dated Sep. 19, 2019 pertaining to U.S. Appl. No. 16/059,550, filed Aug. 9, 2018, 29 pgs.
Examination Report dated Feb. 17, 2020 pertaining to GCC Application No. 2018-35842, filed Aug. 14, 2018, 4 pgs.
Examination Report dated Feb. 5, 2020 pertaining to GCC Application No. 2018-35843, filed Aug. 14, 2018, 3 pgs.
Notice of Allowance and Fee(s) Due dated Jun. 4, 2020 pertaining to U.S. Appl. No. 16/057,378, filed Aug. 7, 2018, 37 pgs.
Office Action dated Mar. 16, 2020 pertaining to U.S. Appl. No. 16/100,836, filed Aug. 10, 2018, 11 pgs.
Office Action dated Mar. 19, 2020 pertaining to U.S. Appl. No. 16/055,890, filed Aug. 6, 2018, 38 pgs.
Notice of Allowance and Fee(s) Due dated Apr. 15, 2020 pertaining to U.S. Appl. No. 16/059,558, filed Aug. 9, 2018, 17 pgs.
Examination Report dated Dec. 28, 2019 pertaining to GCC Application No. 2018-35835, filed Aug. 14, 2018, 3 pgs.
International Search Report and Written Opinion dated Nov. 27, 2018 pertaining to International application No. PCT/US2018/04621 filed Aug. 10, 2018, 8 pgs.
Nhlapo, Susan N., "Intercalation of fatty acids into layered double hydroxides" University of Pretoric, Oct. 1, 2008.
Notice of Allowance and Fee(s) Due dated Jan. 31, 2020 pertaining to U.S. Appl. No. 16/055,881, filed Aug. 6, 2018, 12 pgs.
Notice of Allowance and Fee(s) Due dated Jan. 17, 2020 pertaining to U.S. Appl. No. 16/059,550, filed Aug. 9, 2018, 11 pgs.
Notice of Allowance and Fee(s) Due dated Jan. 17, 2020 pertaining to U.S. Appl. No. 16/059,558, filed Aug. 9, 2018, 11 pgs.
Notice of Allowance and Fee(s) Due dated Jan. 17, 2020 pertaining to U.S. Appl. No. 16/059,867, filed Aug. 6, 2018, 9 pgs.
Office Action dated Feb. 3, 2020 pertaining to U.S. Appl. No. 16/057,378, filed Aug. 7, 2018, 10 pgs.
Office Action dated Feb. 21, 2020 pertaining to U.S. Appl. No. 16/100,829, filed Aug. 10, 2018, 8 pgs.
Notice of Allowance and Fee(s) Due dated Aug. 20, 2020 pertaining to U.S. Appl. No. 16/100,829, filed Aug. 10, 2018, 38 pgs.
Notice of Allowance and Fee(s) Due dated Aug. 20, 2020 pertaining to U.S. Appl. No. 16/055,890, filed Aug. 6, 2018, 27 pgs.
Office Action dated Oct. 28, 2020 pertaining to U.S. Appl. No. 16/100,836, filed Aug. 10, 2018, 51 pgs.
JPH0317193 English Translation. (1991) (Year: 1991).

\* cited by examiner

LAYERED DOUBLE HYDROXIDES FOR OIL-BASED DRILLING FLUIDS

CROSS REFERENCE TO RELATED APPLICATIONS

This application claims the benefit of U.S. Provisional Application Ser. No. 62/545,663 filed Aug. 15, 2017.

TECHNICAL FIELD

Embodiments of the present disclosure generally relate to oil-based drilling fluid for use in high pressure and high temperature drilling operations. More specifically, embodiments of the present disclosure relate to oil-based drilling fluids comprising a surface modified magnesium/aluminum carbonate layered double hydroxide compound as a rheology modifier.

BACKGROUND

Drilling operations to drill a new wellbore for hydrocarbon extraction, for example, include the common practice of continuously circulating a drilling fluid (alternatively known as a drilling mud) through the wellbore during the drilling operation. The drilling fluid is pumped into the drill pipe to the bottom of the borehole where the drilling fluid then flows upwardly through the annular space between the wellbore wall and the drill pipe, and finally flows from the wellbore where it is recovered for secondary processing. Specifically, the drilling fluid is mechanically or chemically treated to remove captured solids and drill cuttings from the drilling fluid and before recirculating the drilling fluid back through the wellbore.

Given the circulating nature of drilling fluid and its functionality in capturing solids and cuttings during drilling operations, drilling fluids must be free-flowing with a relatively low viscosity in order to facilitate pumping while having sufficient substance to retain and transport the cuttings and other solids. The drilling fluid must also have a gel strength sufficient to suspend the solids and cuttings if circulation of the drilling fluid is stopped to prevent accumulation of solids at the bottom of the wellbore. Solids accumulating at the bottom of the wellbore would potentially result in jamming of the drill as well as physical blockage of the drilling fluid's flow path.

Drilling in deep wells is complicated by geological conditions that involve high pressures and high temperatures (HPHT). The industry-defined definition of HPHT conditions typically include a wellbore temperature greater than 300 degrees Fahrenheit (° F.) (149 degrees Celsius (° C.)) and a wellbore pressure greater than 10,000 pounds-force square inch (psi) (68.9 megapascals (MPa)).

SUMMARY

Thus, there are ongoing needs for drilling fluids and rheology modifiers for drilling fluids that are thermally stable under HPHT conditions and that have suitable rheological properties for uses in well treatments. Rheology modifiers, when added to oil based drilling fluids, can enhance rheological properties, such as "fragile gel" properties and shear thinning behavior.

Accordingly, some embodiments of this disclosure include an oil-based drilling fluid comprising a base oil continuous phase, in which the base oil continuous phase includes a base oil, an aqueous dispersed phase, and at least one rheology modifier comprising a modified magnesium/aluminum carbonate layered-double hydroxide (Mg/Al—$CO_3$ LDH) compound.

Other embodiments of this disclosure include methods for preparing an oil-based drilling fluid, in which the method includes mixing a base oil, at least one emulsifier, and at least one wetting agent to form a base oil continuous phase; and adding at least one rheology modifier into the base oil continuous phase to form a oil-based drilling fluid, in which the at least one rheology modifier comprises a modified magnesium/aluminum carbonate layered-double hydroxide compound.

DETAILED DESCRIPTION

Specific embodiments of the drilling fluids with the rheological modifiers will now be described. It should be understood that the rheological modifiers and the drilling fluids of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

To drill a subterranean well, a drill string, including a drill bit and drill collars to weight the drill bit, is inserted into a predrilled hole and rotated to cause the drill bit to cut into the rock at the bottom of the hole. The drilling operation produces rock fragments. To remove the rock fragments from the bottom of the wellbore, a drilling fluid, such as the oil-based drilling fluid, is pumped down through the drill string to the drill bit. The drilling fluid cools the drill bit, provides lubrication, and lifts the rock fragments known as cuttings away from the drill bit. The drilling fluid carries the cuttings upwards as the drilling fluid is recirculated back to the surface. At the surface, the cuttings are removed from the drilling fluid through a secondary operation, and the drilling fluid is recirculated back down the drill string to the bottom of the wellbore to collect further cuttings.

Drilling fluids include drilling muds, packer fluids, and completion fluids. Generically, drilling fluids serve a number of functions, with the different types of fluids specializing in a particular function or functions. In one or more embodiments, the oil-based drilling fluid suspends the cuttings and weighted material and transports the cutting to the wellbore surface with the oil-based drilling fluid. Additionally, the oil-based drilling fluid may absorb gases in a wellbore, such as carbon dioxide ($CO_2$), hydrogen sulfide ($H_2S$), and methane ($CH_4$), and transport them to the wellbore surface for release, sequestration, or burn-off. The oil-based drilling fluids additionally may provide buoyancy to the drill string, relieving the tension on the drill string as the length of the wellbore increases. In one or more embodiments, the oil-based drilling fluid also provides a cooling and lubrication functionality for cooling and lubrication of the bit and drill string utilized in boring operations. In other embodiments, the oil-based drilling fluid may control subsurface pressures. Specifically, the oil-based drilling fluid may provide hydrostatic pressure in the wellbore to provide support to the sidewalls of the wellbore and prevent the sidewalls from collapsing or caving in on the drill string. Additionally, the oil-based drilling fluid may provide hydrostatic pressure in the wellbore to prevent fluids in the downhole formations from flowing into the wellbore during drilling operations.

Under certain extreme downhole conditions, such as excessive temperature or difficult formations, some of the properties of the drilling fluid may be altered. For example, interaction of a drilling fluid with a formation having swelling clay, excessive solids content, or both, or subjecting the drilling fluid to extreme downhole temperatures may cause the drilling fluid to thicken or thin, excessively increase or decrease in viscosity, or any combination of these. For example, a drilling fluid utilized in a high pressure and high temperature (HPHT) operations may experience a wellbore temperature greater than 300° F. (149° C.) and a wellbore pressure greater than 10,000 psi (68.9 MPa) which is the industry-defined definition of HPHT conditions. Under HPHT conditions, drilling fluids may decompose or experience undesirable changes in rheology.

Embodiments of the oil-based drilling fluid are formulated to provide a fluid having a rheology suitable for HPHT drilling operations. Specifically, the oil-based drilling fluids are formulated to have a greater viscosity at lower shear rates than commercially available HPHT oil-based drilling fluids have, as well as a lower viscosity at high shear rates than commercially available HPHT oil-based drilling fluids have. Low shear rates are usually below 10 $s^{-1}$ and high shear rates are generally greater than 100 $s^{-1}$. The greater viscosity at low shear rates increases the ability of the oil-based drilling fluid to hold cuttings when drilling operations are halted. Conversely, the lower viscosity of the oil-based drilling fluids at high shear rates decreases the energy required to circulate the oil-based drilling fluid during drilling operations.

In one or more embodiments, an oil-based drilling fluid includes a base oil phase, an aqueous dispersed phase, and at least one rheology modifier. The at least one rheology modifier includes a carbonate layered-double hydroxide (LDH) compound. In some embodiments, the carbonate LDH compound is or includes a magnesium/aluminum-carbonate layered double-hydroxide (Mg/Al—$CO_3$ LDH) compound. The Mg/Al—$CO_3$ LDH compound may have an empirical formula $[Mg_{1-x}Al_x(OH)_2](CO_3)_{x/3} \cdot mH_2O$, where x is from 0.1 to 0.4 and m is from 0.1 to 0.6. In some embodiments, the Mg/Al—$CO_3$ LDH compound itself, or the surfaces of particles of the Mg/Al—$CO_3$ LDH compound, for example may be modified. In some embodiments of the oil-based drilling fluids, the oil-based drilling fluid may include from 0.05 wt. % to 5.0 wt. %, 0.1 wt. % to 1.0 wt. %, or from 0.1 wt. % to 0.5 wt. % magnesium/aluminum carbonate LDH compound, based on the total weight of the oil-based drilling fluid.

Particles of the Mg/Al—$CO_3$ LDH rheology modifier may be prepared by forming a slurry or an aqueous solution of a magnesium compound and an aluminum compound. One or more basic compounds may be added to the slurry or aqueous solution to form a reaction mixture. At least one basic compound may include a carbonate salt or a bicarbonate salt. The reaction mixture is heated at a reaction temperature for a reaction time to form the Mg/Al—$CO_3$ LDH. The aluminum compound may include $Al(OH)_3$, $Al_2O_3$, $Al(NO_3)_3$, or $AlCl_3$, for example. The magnesium compound may include $Mg(OH)_2$, $Mg(NO_3)_2$, $MgCl_2$, or MgO, for example. In one example, the magnesium compound may be $Mg(NO_3)_2$ and the aluminum salt may be $Al(NO_3)_3$. In some embodiments, the magnesium salt or aluminum salt may be a hydrate such as $Al(NO_3)_3 \cdot 9H_2O$ or $Mg(NO_3)_3 \cdot 6H_2O$, for example. The basic compound includes a carbonate salt or a bicarbonate salt. Examples of carbonate salts include $Na_2CO_3$ and $NaHCO_3$. In addition to the carbonate salt or bicarbonate salt, the basic compound optionally may further include a base such as $Mg(OH)_2$, $Al(OH)_3$, or NaOH.

The preparation of the Mg/Al—$CO_3$ LDH compound rheology modifier for the drilling fluid of this disclosure may include additional or optional steps. Optionally, the pH of the slurry, the aqueous solution, or the reaction mixture may be adjusted with one or more basic compounds or an acid solution, such as NaOH. The slurry, the aqueous solution, or the reaction mixture may have an initial pH of from 7 to 12, and the initial pH may be adjusted to from 7 to 10.5, from 7 to 10, from 9 to 12, from 9 to 10.5, from 9 to 10, from 9.5 to 12, from 9.5 to 10.5, from 9.5 to 10, from 7.5 to 9, from 7.5 to 9.5, or from 10 to 12. Adjusting the pH reduces corrosion of the tubulars.

The initial slurry, aqueous solution, or reaction mixture for preparing the Mg/Al—$CO_3$ LDH compound may have an Mg/Al molar ratio of 5:1, 4:1, 3:1 or 2:1. The carbonate ion was added in molar ratio in relation with Mg/Al ratio. In one or more embodiments, the molar ratio of carbonate ion may be equivalent to molar ratio of Al in the compound.

The reaction temperature for preparing the Mg/Al—$CO_3$ LDH compound may be from 40° C. to 180° C. or from 140° C. to 160° C. The reaction time may be at least 12 hours. In some embodiments the reaction time is from 12 hours to 50 hours or from 16 hours to 25 hours.

The based oil continuous phase may be any fluid such as an oil or a solution containing an oil and one or more organic or inorganic compounds dissolved in the oil or otherwise completely miscible with the oil. The based oil continuous phase may include at least one base oil. The based oil continuous phase may further include esters, ethers, acetals, dialkylcarbonates, hydrocarbons, or combinations of any of these.

The base oil may be chosen from natural petroleum product or synthetic oil. The synthetic oil or natural petroleum product may be composed of hydrocarbons such as n-paraffins, iso-paraffins, cyclic alkanes, branched alkanes, or mixtures thereof. The based oil may include oils derived from petroleum, such as mineral oils, diesel oils, linear or branched olefins, polyolefins, esters of fatty acids, straight chain, branched or cyclical alky ethers of fatty acids, other petroleum-derived oils, or combinations of any of these. The based oil may also include oils derived from animals or plants, such as safra oil, for example. The based oil may also include other oils, such as but not limited to, polydiorganosiloxanes, siloxanes, organosiloxanes, other silicone-based oils, or combinations of these. In some embodiments, the based oil may be any oil included in conventional drilling fluids for drilling applications.

In some embodiments, the oil-based drilling fluid may contain at least 10.0 wt. % based oil or may include from 10.0 wt. % to 20.0 wt. % base oil, based on the total weight of the oil-based drilling fluid. In other embodiments, the oil-based drilling fluid may contain from approximately 13.0 wt. % to 17.0 wt. % or 14.0 wt. % to 16 wt. % base oil, based on the total weight of the oil-based drilling fluid.

The aqueous dispersed phase of the oil-based drilling fluid may be any fluid that is not completely miscible in the based oil continuous phase. For example, the aqueous dispersed phase may be water or a solution containing water and one or more organic or inorganic compounds dissolved in the water or otherwise completely miscible with the water. In some embodiments, the aqueous dispersed phase may contain water, including freshwater, well water, filtered water, distilled water, sea water, salt water, produced water, formation brine, other type of water, or combinations of waters. In embodiments, the aqueous dispersed phase may contain brine, including natural and synthetic brine. Brine includes water and a salt chosen from calcium chloride, calcium bromide, sodium chloride, sodium bromide, and combinations thereof, for example. In some embodiments, the aqueous dispersed phase may include water-soluble organic compounds, as additives or impurities dissolved in the water. The water-soluble organic compounds may include: alcohols, organic acids, amines, aldehydes, ketones, esters, or other polar, water-soluble organic compounds.

In one or more embodiments, the oil-based drilling fluid may contain from approximately 1.0 wt. % to approximately 10.0 wt. % aqueous discontinuous phase, based on the total weight of the oil-based drilling fluid. In other embodiments, the oil-based drilling fluid may include from 2.0 wt. % to 7.0 wt. % or from 2.0 wt. % to 5 wt. % aqueous discontinuous phase.

The oil-based drilling fluid optionally may include one or more additives. Example additives include one or more wetting agents, one or more emulsifiers, one or more additional rheology modifiers, one or more fluid-loss control additives, or one or more weighting additive. The oil-based drilling fluid optionally may include pH adjusters, electrolytes, glycols, glycerols, dispersion aids, corrosion inhibitors, defoamers, or other additives or combinations of additives known or used in conventional drilling fluids.

In one or more embodiments, the oil-based drilling fluid may contain a surfactant such as a wetting agent to enhance the stability of suspensions or emulsions in the oil-based drilling fluid. Suitable wetting agents may include fatty acids, organic phosphate esters, modified imidazolines, amidoamines, alkyl aromatic sulfates, and sulfonates. For example, SUREWET®, commercially available from M-I SWACO Houston, Tex., is an oil based wetting agent and secondary emulsifier that may be used to wet fines and drill solids to prevent water-wetting of solids. Moreover, SUREWET® may improve thermal stability, rheological stability, filtration control, emulsion stability of wellbore VERSAWET®, commercially available from M-I LLC, Houston, Tex., is a wetting agent that is especially effective in hematite systems. An example oil-based drilling fluid optionally may include from 0.1 wt. % to 2.0 wt. % of a wetting agent based on the total weight of the oil-based drilling fluid. In some embodiments, the oil-based drilling fluid optionally may include from 0.25 wt. % to 0.75 wt. % SUREWET® based on the total weight of the oil-based drilling fluid. The oil-based drilling fluid may optionally include other wetting agents known or used in conventional drilling fluids.

The oil-based drilling fluids optionally may include one or more emulsifiers that facilitate formation of an emulsion and reduce interfacial tension between the base oil phase of the oil-based drilling fluid and the aqueous dispersed phase of the oil-based drilling fluid. In some embodiments one or more emulsifiers may be added to the oil-based drilling fluid. Examples of emulsifiers include surfactants, detergents, lignosulfonates, lignitic compounds, and materials derived from tall oil fatty acids (TOFA). Additional example emulsifiers include an invert emulsifier and oil-wetting agent for synthetic based drilling fluid systems such as LE SUPER-MUL™ commercially available from Halliburton Energy Services, Inc. and MUL XT commercially available from M-I SWACO.

In one or more embodiments, the oil-based drilling fluid optionally may contain one or a plurality of emulsifiers, and the total amount of emulsifier in the oil-based drilling fluid may be from 0.00 wt. % to 5 wt. %, from 0.1 wt. % to 2.5 wt. %, from 0.1 wt. % to 2.0 wt. %, from 0.1 wt. % to 1 wt. %, from 0.5 wt. % to 2.5 wt. %, from 0.5 wt. % to 2 wt. %, from 0.5 wt. % to 1.5 wt. %, from 0.5 wt. % to 1 wt. %, from 0.75 wt. % to 2.5 wt. %, or from 0.75 wt. % to 2 wt. %, based on the total weight of the drilling fluid.

The oil-based drilling fluid optionally may include a fluid-loss control agent that reduces the amount of filtrate lost from the drilling fluid into a subsurface formation. Examples of fluid-loss control agents include organophilic (for example, amine-treated) lignite, bentonite, manufactured polymers, and thinners or deflocculants. Additional examples of fluid-loss control agents include: VERSATROL™, VERSALIG™, ECOTROL™ RD, ONETROL™ HT, EMI 789, and NOVATECH™ F, all commercially available from MI SWACO, Houston, Tex., U.S.A.; and ADAPTA® which is commercially available from Halliburton Energy Services, Inc. In some embodiments, the oil-based drilling fluid may optionally include both ONETROL™ HT and ECOTROL™ RD. In some embodiments, when fluid-loss control agents are included in the oil-based drilling fluid, the total amount of fluid-loss control agents may be from approximately 0.5 wt. % to approximately 3.0 wt. % of the oil-based drilling fluid, based on the total weight of the drilling fluid. In other embodiments, the oil-based drilling fluid may include from 0.9 wt. % to 2.5 wt. % or from 1.0 wt. % to 2.0 wt. %.

The oil-based drilling fluid optionally may include a suspending agent that adjusts the viscosity of the oil-based drilling fluid to result in a yield point at a low shear rate sufficient to suspend all of the drilling fluid components and thereby avoid the settling of components of the drilling fluid. Examples of suspending agents include fatty acids and fibrous materials. In embodiments for which the oil-based drilling fluid includes a suspending agent, the oil-based drilling fluid may contain from approximately 0.0 wt. % to approximately 1.0 wt. % or 0.01 to 0.5 wt. %, based on the total weight of the drilling fluid.

In some embodiments, the oil-based drilling fluid may optionally include a weighting material. The weighting material may be a particulate solid chosen to have a specific gravity (SG) sufficient to increase the density of the drilling fluid by a desired amount. Weighting materials may be used to control formation pressures and to help combat the effects of sloughing or heaving shales that may be encountered in stressed areas. Any substance that is more dense than water and that does not adversely affect other properties of the drilling fluid can be used as a weighting material. The weighting material may have a specific gravity (SG) of from 2 to 6. Examples of weighting materials include, but are not limited to, barite ($BaSO_4$); hematite ($Fe_2O_3$); calcium carbonate ($CaCO_3$); siderite; manufactured iron oxide, such as ilmenite ($FeO.TiO_2$), siderite ($FeCO_3$), celesite ($SrSO_4$), and dolomite ($CaCO_3.MgCO_3$); galena (PbS), magnetite ($Fe_3O_4$) and other weighting materials, or any combination of these weighting materials. Some embodiments of the oil-based drilling fluid may include barite as the weighting material.

The optional weighting materials or density adjusting agents of the oil-based drilling fluid may increase the weight of the oil-based drilling fluid, the density of the oil-based drilling fluid, or both. In some embodiments, the oil-based drilling fluid may include from 1 wt. % to 75 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, or from 70 wt. % to 80 wt. % weighting material based on the total weight of the oil-based drilling fluid. In general, the amount of optional weighting material in the oil-based drilling fluid is sufficiently great to attain a desirable density of the oil-based drilling fluid and is sufficiently small to avoid an oil-based drilling fluid that cannot be circulated through a wellbore.

The oil-based drilling fluid optionally may include a pH adjuster. In embodiments, the oil-based drilling fluid optionally may include an alkaline compound that increases the pH of the oil-based drilling fluid. Examples of alkaline compounds include, but are not limited to, lime (calcium hydroxide or calcium oxide), soda ash (sodium carbonate), sodium hydroxide, potassium hydroxide, other strong bases, or combinations of these alkaline compounds. The alkaline compounds may react with gases, such as $CO_2$ or $H_2S$ for example, in the oil-based drilling fluid during drilling operations to prevent the gases from hydrolyzing components of the oil-based drilling fluid. Some example oil-based drilling fluids optionally may include from 0.1 wt. % to 1.5 wt. %, 0.4 wt. % to 1 wt. %, or 0.6 wt. % to 0.8 wt. % lime. In embodiments, the oil-based drilling fluid may have a pH of from 7 to 12, from 7 to 10.5, from 7 to 10, from 9 to 12, from 9 to 10.5, from 9 to 10, from 9.5 to 12, from 9.5 to 10.5, from 9.5 to 10, from 7.5 to 9, from 7.5 to 9.5, or from 10 to 12. In some embodiments, the oil-based drilling fluid may have a pH of from 9 to 10.5.

In some embodiments, the oil-based drilling fluid optionally may include one or more rheology modifiers, such as viscosifiers or clays, in addition to the Mg/Al—$CO_3$ LDH compound. Examples of viscosifiers may include, but are not limited to, bentonite, organophilic clay, polyacrylamide, polyanionic cellulose, or combinations of these viscosifiers. In some embodiments, the oil-based drilling fluid may optionally include hectorite clay, for example, VERSAGEL HT commercially available from MI-SWACO, Houston, Tex. In some embodiments, the oil-based drilling fluid may optionally include an organophilic clay, for example Bentone® 42 commercially available from Elements Specialties Inc., Hightstown, N.J. An example oil-based drilling fluid optionally may include from 0.0 wt. % to 2 wt. % of rheology modifier in addition to the Mg/Al—$CO_3$ LDH compound, based on the total weight of the oil-based drilling fluid. In some embodiments, the oil-based drilling fluid optionally may include from 0.25 wt. % to 0.5 wt. % of each of VERSAGEL HT and Bentone 42 based on the total weight of the oil-based drilling fluid. The oil-based drilling fluid may optionally include other viscosifiers known or used in conventional drilling fluids.

Having previously described the oil-based drilling fluids according to various embodiments, illustrative methods for preparing the oil-based drilling fluids will now be described. In one or more embodiments, methods for preparing an oil-based drilling fluid include mixing a base oil, optionally at least one emulsifier, and optionally at least one wetting agent, to form a base oil continuous phase. At least one rheology modifier is added to the base oil continuous phase to form the oil-based drilling fluid. The at least one rheology modifier includes a Mg/Al—$CO_3$ LDH compound, as previously described.

Optionally, the methods for preparing the oil-based drilling fluids may include adding at least one additive; the additive includes a fluid-loss control additive, a brine solution, a weighting material, and combinations of the additives. The fluid-loss control additive may be added in an amount that provides a final oil-based drilling fluid containing approximately 0.5 wt. % to approximately 3.0 wt. % of the oil-based drilling fluid or from 0.9 wt. % to 2.0 wt. % or from 1.0 wt. % to 1.5 wt. % fluid-loss control additive, based on the total weight of the oil-based drilling fluid. After the additive is added, the oil-based drilling fluid is mixed by an appropriate agitation method, such as by mechanical stirring.

The brine solution may be added in an amount that provides a final oil-based drilling fluid containing from approximately 1.0 wt. % to approximately 10.0 wt. % brine or from approximately 2.0 wt. % to approximately 6.0 wt. %, based on the total weight of the oil-based drilling fluid.

The weighting material may be added to the fourth mixture in an amount that provides to a final oil-based drilling fluid containing from 1 wt. % to 75 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, from 65 wt. % to 78 wt. %, or from 70 wt. % to 80 wt. % weighting material based on the total weight of the oil-based drilling fluid.

The oil-based drilling fluids previously described, including oil-based drilling fluids prepared according to embodiments of methods for preparing oil-based drilling fluids in this disclosure, as well as oil-based drilling fluids according to embodiments of this disclosure but prepared by other industry-acceptable techniques understood by the person of ordinary skill, may be well-suited for use in drilling operations in subterranean formations, particularly for drilling operations performed under HPHT conditions of a wellbore pressure greater than 10,000 psi and a wellbore temperature greater than 300° F. (149° C.). Accordingly, embodiments of methods for drilling in a subterranean formation under high-pressure high-temperature conditions may include using the oil-based drilling fluid for the drilling of a wellbore in a subterranean formation.

In the methods for drilling in a subterranean formation, the oil-based drilling fluid includes a modified Mg/Al—$CO_3$ LDH compound as a rheology modifier. Under high-pressure high-temperature conditions, which includes temperature from 250° F. (120° C.) to 400° F. (205° C.) and pressures from 10,000 pound-force per square inch (psi) to 20,000 psi, the oil-based drilling fluid may have a lower viscosity than the viscosity of a comparative drilling fluid would have at the same conditions. As used here, a "comparative drilling fluid" is a drilling fluid having all the same ingredients as the oil-based drilling fluid in weight proportions to each other identical to the weight proportions of the same ingredients to each other in the oil-based drilling fluid, with the exceptions that (1) the comparative drilling fluid lacks the Mg/Al—$CO_3$ LDH compound; and (2) one or both of the amount of base oil or the amount of weighting agent in the comparative drilling fluid is adjusted so that the comparative drilling fluid has a specific gravity that matches the specific gravity of the oil-based drilling fluid and an oil-to-water ratio that matches the oil-to-water ratio of the oil-based drilling fluid.

EXAMPLES

The following examples illustrate one or more additional features of the present disclosure described previously. It should be understood that these examples are not intended to limit the scope of the disclosure or the appended claims in any manner.

Example 1

Preparation of Magnesium/Aluminum-Carbonate Layered Double Hydroxides

To prepare a magnesium/aluminum-carbonate LDH with a 2:1 molar ratio of Mg to Al, 100 mL of 0.4 M $Mg(NO_3)_2$, 100 mL of 0.2 M Al(NO$_3$)$_3$ were transferred to a burette. A 1000 mL reaction vessel was charged with 100 mL of 0.03 M Na$_2$CO$_3$ solution. The metal nitrate solutions were slowly added to the solution of Na$_2$CO$_3$ while the reaction mixture was stirred. The pH of the reaction was adjusted to and maintained at a pH of 10 using 1 N NaOH. The entire reaction stirred at a reaction temperature of 65° C. After the solutions were added, the resultant product slurry was aged for 24 h. Then, the product was washed with copious amount of water to remove the excess sodium present in the sample. Surface modification of freshly prepared Mg/Al—CO$_3$ LDH was carried out by rinsing the sample twice with the 50 mL of acetylacetonate for about 2 min. The sample was recovered by centrifugation followed by heating in the oven at 70° C. for overnight.

Example 2

Rheology Studies of Drilling Fluids

To compare the physical and rheological properties of a drilling fluid containing a Mg/Al—CO$_3$ LDH with those of a drilling fluid containing an industry standard rheology modifier, two drilling fluids were prepared: a drilling fluid of Example 1 and a Comparative Fluid. The two drilling fluids were based on the M-I SWACO RHADIANT™ system that includes a blend of three proprietary emulsifiers, fluid-loss control agents, and rheology modifier specially tailored for oil-based fluid formulations. The drilling fluid of Example 1 was prepared using SUREWET® as the wetting agent, SUREMUL® as an emulsifier, and Mg/Al—CO$_3$ LDH as a rheology modifier. The Comparative Fluid was prepared by replacing Mg/Al—CO$_3$ LDH with Bentone 42 with and increasing the amount of based oil.

The two drilling fluids were formulated using the following ingredients: Saraline 185V, a synthetic oil drilling base fluid, available from Shell; SUREMUL®, an amidoamine emulsifier, available from M-I SWACO, LLC (Houston, Tex., USA); SUREWET®, a wetting agent, available from M-I SWACO, LLC (Houston, Tex., USA); MUL XT, an emulsifier for use in non-aqueous fluid systems, available from M-I SWACO, LLC (Houston, Tex., USA); VERSA-GEL HT, a hectorite clay viscosifier for aiding in filtercake formation and filtration control, available from M-I SWACO, LLC (Houston, Tex., USA); ONE-TROL™ HT, an amine-treated tannin filtration control additive designed for use in oil and synthetic-base drilling fluid systems, available from M-I SWACO, LLC (Houston, Tex., USA); ECOTROL RD, a filtration control additive designed for use in oil and synthetic-base drilling fluid systems, available from M-I SWACO, LLC (Houston, Tex., USA); and barite (BaSO$_4$) weighting agent, available from M-I SWACO, LLC (Houston, Tex., USA).

Referring to Table 1, the two drilling fluids were prepared in approximately 771.9 g quantities. The formulations and other ingredients amounts are provided in Table 1 for the two drilling fluids. To prepare the drilling fluids, the base oil, emulsifiers, and wetting agents were mixed together first for 10 minutes during stage 1, and then the viscosity modifiers and rheology modifiers were added and mixed for another 20 minutes during stage 2. Next, in stage 3 the fluid-loss control additives were added and mixed for 20 minutes, followed by brine and fresh water in stage 4 and barite in stage 5, which were mixed for 30 minutes and 40 minutes, respectively. The Mg/Al—CO$_3$ LDH formulation or drilling fluid of Example 1 had one gram more of base oil than the Comparative Fluid to provide a specific gravity of 2.20 and an oil/water ratio of 90.0, identical to the respective properties of the Comparative Fluid.

TABLE 1

Formulation and Mixing Procedure for HPHT Oil Based Drilling Fluids

| Ingredient | Function | Mg/Al—CO$_3$ LDH (Example 1) (g) | Comparative Fluid (g) | Mixing Order and Time |
|---|---|---|---|---|
| Saraline 185 V | Base Oil | 122.0 | 122.0 | Stage 1 (5 min) |
| SUREMUL | Emulsifier | 10.0 | 10.0 | |
| SUREWET | Wetting Agent | 4.0 | 4.0 | |
| MUL XT | Emulsifier | 4.0 | 4.0 | |
| VERSAGEL HT | Viscosifier | 2.75 | 2.75 | Stage 2 (10 min) |
| Bentone 42 | Rheology Modifier | 0.0 | 2.75 | |
| Mg/Al—CO$_3$ Layered Double Hydroxide | Rheology Modifier | 2.75 | 0.0 | |
| Lime | Alkalinity Control | 6.0 | 6.0 | |
| ONE-TROL HT | Fluid Loss Control | 8.0 | 8.0 | Stage 3 (10 min) |
| ECOTROL RD | Fluid Loss Control | 0.8 | 0.8 | |
| CaCl$_2$ brine | Internal Phase | 28.5 | 28.5 | Stage 4 (15 min) |
| Fresh water | Internal Phase | 5.9 | 5.9 | |
| Barite | Weight Material | 577.3 | 577.2 | Stage 5 (20 min) |
| Total | | 772 | 771.9 | 60 min |
| Specific Gravity | | 2.20 | 2.20 | |
| Oil/Water Ratio (volumetric) | | ~90.0 | ~90.0 | |

Rheological properties measured with a rotational viscometer commonly used to calculate hydraulics of a drilling fluid. A rotational viscometer is used to measure shear rate/shear stress of a drilling fluid, from which the plastic viscosity and yield point are calculated directly. The drilling fluid of Example 1 and the Comparative Fluid were tested to determine their rheological properties before and after hot rolling, which is known as high-temperature aging. The rheological properties studied were viscosity, gel strength, fluid loss, plastic viscosity, and yield point of the drilling fluids. These properties were studied using the Fann Model 35 VG Meter, a rotational viscometer. The electrical stability and filter cake thickness of the drilling fluids were tested with other instruments described in the proceeding paragraphs.

The drilling fluid of Example 1 and the Comparative Fluid were aged by a dynamic high-temperature fluid aging technique, commonly known as hot-rolling. This technique was conducted to assess the impact that temperatures greater than 250° F. have on the performance of the drilling fluids. The oil-based drilling fluids were rolled under pressures of 150 pounds per square inch (psi) at 350° C. for 16 hours in an aging cell. The hot rolling in a pressurized system simulates the fluid under drilling conditions, and thereby aging it. By testing the viscosities, gel strengths, and other rheological properties of the drilling fluids before and after hot rolling, the results should indicate the ability of the drilling fluids to withstand the HPHT conditions in the wellbore.

The viscosities of the drilling fluid of Example 1 and the Comparative Fluid were measured at 120° F. in a rotational viscometer. The 350 mL of drilling fluid of Example 1 or the Comparative Fluid was placed in the Fann 35 heating cups and heated to 120° F. The drilling fluid of Example 1 and the Comparative Fluid were tested at the shear rates of 600, 300, 200, 100, 6, and 3 rpm to determine the viscosities of each drilling fluid at a specific rate. This test was performed before and after hot rolling. Generally, a higher viscosity at a high shear rate would indicate that more energy would be required to move or pump the fluid. A drilling fluid having a lower viscosity at a high shear rate in a wellbore is more energy efficient.

The gel strength is the shear stress measured at a low shear rate after a drilling fluid has set quiescently for a period of time (usually 10 seconds and 10 minutes). The gel strength demonstrates the ability of a drilling fluid to suspend drill solid and weighting material when circulation in the wellbore ceases. The gel strengths of the drilling fluids were measured before and after hot rolling. The gel strengths of drilling fluid of Example 1 and the Comparative Fluid were tested at 10 seconds and 10 minutes in accordance to the American Petroleum Institute (API) Recommended Practice 13B-1, incorporated by reference into this disclosure in its entirety.

The plastic viscosity of a fluid is related to the resistance of that fluid to flow due to mechanical interactions between the components of the fluid. The plastic viscosity of a drilling fluid may be calculated by measuring the shear stress of the drilling fluid using a viscometer at shear rates of 5 Hz (300 rpm) and 10 Hz (600 rpm) and subtracting the 5 Hz viscosity from the 10 Hz viscosity as shown in Eq. (1).

$$PV=\text{(viscosity at 10 Hz)}-\text{(viscosity at 5 Hz)} \qquad \text{Eq. (1)}$$

High shear rates are chosen for this calculation because the viscosity of Bingham plastic fluids exhibit more linear behavior at higher shear rates.

The yield point (YP) represents the minimum shear stress required to make a fluid flow. If a fluid is subjected to a shear stress less than the fluid's yield point, then the fluid will behave as a rigid body. If a fluid is subjected to a shear stress at or greater than the fluid's yield point, then the fluid will flow. The yield point is representative of the carrying capacity of a fluid. Fluids with greater yield points will be able to carry more mass. A drilling fluid with a greater yield point can carry a greater mass of formation cuttings. The yield point of a drilling fluid can be tailored for specific situations or specific types of formation cutting removal by altering the composition of the fluid.

The yield point of a fluid is determined by extrapolating the Bingham plastic rheology model to a shear rate of zero according to API Recommended Practice 13B-1. The yield point of a drilling fluid can be calculated from rheological data and the plastic viscosity according to Eq. (2).

$$YP=\text{(viscosity at 5 Hz)}-PV \qquad \text{Eq. (2)}$$

The yield point is expressed as a force per area, such as pounds of force per one hundred square feet (lbf/100 ft$^2$) or newtons per square meter (N/m$^2$). One pound of force per one hundred square feet is equal to about 4788 newtons per square meter (1 lbf/100 ft$^2$=4788 N/m$^2$).

The fluid loss (FL) test measures the filtration of a drilling fluid with ambient temperature and 100 psi differential pressure. When the drilling fluid has good fluid loss property, the result is a thin and impermeable mud cake. The API filtration test or fluid loss test was conducted on the drilling fluid of Example 1 and the Comparative Fluid after the aging technique by using a filtration apparatus (API filter press OFITE® apparatus). Each drilling fluid was placed into stainless steel chambers with an opening at the bottom. A filter paper was placed on the bottom and the mud was exposed to a pressure of 500 psi at 350° F. for 30 minutes (min) and the quantities of fluid collected were doubled when recorded (see Table 3). The results were doubled to create an adequate comparison with the low pressure test, which has a filter are twice the size of the high temperature and pressure filter press. The volume of the filtrate is double for HTHP oil-based much testing according to API standards.

The electrical stability of an oil-based drilling fluid is measured by applying a steadily increasing sinusoidal alternating voltage across a pair of parallel flat plate electrodes submerged in the oil-based drilling fluid. The resulting current will remain very low until a threshold voltage is reached. At this voltage, conduction between the two electrodes occurs, resulting in a rapid increase in current. When this current reaches 61 µA, the peak voltage is measured and reported as the electrical stability for the drilling fluid or other material. Electrical stability of an oil-based drilling fluid is influenced by factors such as the resistivity of the oil continuous phase, the conductivity of the non-continuous phase such as water and dissolved solids or salts, properties of suspended solids, temperature, droplet size, types of emulsifiers or additives, dielectric properties of the fluids, and shear history of the sample being tested. In general, an increase in the electrical stability voltage data is correlated with a greater emulsion stability.

The oil-based drilling fluid of Example 1 and Comparative Fluid were evaluated twice, once before hot rolling and once after hot rolling, for viscosity, gel strength, plastic viscosity (PV), yield point (YP), and electrical stability (ES) according to the methods previously described. The first sets of measurements were recorded before hot rolling and provided in Table 2. The second sets of measurement were recorded after hot rolling and provided in Table 3.

TABLE 2

HPHT Oil-Based Drilling Fluids:
Properties at 120° F. Before Hot Rolling

|  |  | Example 1 | Comparative Fluid |
|---|---|---|---|
| Viscosity Centipoise (cP) | 600 rpm | 124 | 152 |
|  | 300 rpm | 66 | 86 |
|  | 200 rpm | 47 | 62 |
|  | 100 rpm | 27 | 37 |
|  | 6 rpm | 6 | 9 |
|  | 3 rpm | 5 | 7 |
| 10 s gel strength (lbf/100 ft$^2$) |  | 7 | 7 |
| 10 min gel strength (lbf/100 ft$^2$) |  | 10 | 8 |
| PV (cP) |  | 58 | 66 |
| YP (lbf/100 ft$^2$) |  | 8 | 20 |
| ES (V) |  | 1422 | 1173 |
| Filter cake thickness (mm) |  | ~2.0-2.5 | ~2.5-3.0 |

TABLE 3

HPHT Oil-Based Drilling Fluids:
Properties at 120° F. After Hot Rolling

|  |  | Example 1 | Comparative Fluid |
|---|---|---|---|
| Viscosity Centipoise (cP) | 600 rpm | 106 | 149 |
|  | 300 rpm | 54 | 80 |
|  | 200 rpm | 39 | 55 |
|  | 100 rpm | 22 | 32 |
|  | 6 rpm | 5 | 6 |
|  | 3 rpm | 4 | 5 |
| 10 s gel strength (lbf/100 ft$^2$) |  | 6 | 7 |

TABLE 3-continued

HPHT Oil-Based Drilling Fluids:
Properties at 120° F. After Hot Rolling

|  | Example 1 | Comparative Fluid |
|---|---|---|
| 10 min gel (lbf/100 ft$^2$) | 7 | 7 |
| PV (cP) | 52 | 69 |
| YP (lbf/100 ft$^2$) | 2 | 11 |
| ES (V) | 1212 | 402 |
| HPHT FL (mL) at 350° F. results doubled | 5.2 | 6.8 |

The shear thinning data in Table 2 and Table 3 are correlated to the viscosity in the annuli during a drilling operation, where a less viscous fluid generally is more desirable than a more viscous fluid. The annulus of an oil well is any void between any piping, tubing or casing. The dial reading on the Fann 35 at a rotational speed of 100 rms represents the viscosity in the annulus, and hence the Equivalent Circulating Density. As shown in Table 2 and Table 3, the drilling fluid of Example 1 had a viscosity less than that of the Comparative Fluid before and after hot rolling at 100 rpm. The viscosity of the drilling fluid of Example 1 was less than that of the Comparative Fluid at 600 rpm, 300 rpm, 200 rpm, 100 rpm, and 3 rpm. The viscosity after hot rolling of the drilling fluid of Example 1 was less than that of the Comparative Fluid at 6 rpm after hot rolling. The decrease in the viscosities of the drilling fluid of Example 1 in comparison to the viscosities of the Comparative Fluid was attributed to the rheology modifier, modified magnesium/aluminum-carbonate layered-double hydroxide (MgAlCO$_3$ LDH) compound. Thus, the drilling fluid containing the modified Mg/AlCO$_3$ LDH compound was less susceptible to thermal breakdown than was the Comparative Fluid.

The gel strengths of the drilling fluid of Example 1 and the Comparative Fluid after 10 seconds (s) and after 10 minutes before and after hot rolling were consistently around 7 lbf/100 ft$^2$ indicating that both fluids are thermally stable.

The oil-based drilling fluid of Example 1 containing the modified MgAlCO$_3$ LDH compound yielded a decrease in the plastic viscosity (PV) when compared to the Comparative Fluid. As previously described, the yield point (YP) represents the stress or energy required to move the fluid. The YP for the drilling fluid of Example 1 was 8 cP before hot rolling and 2 cP after hot rolling. The YP for the Comparative Fluid was 20 cP before hot rolling and 11 cP after hot rolling. The decrease of the YP is attributed to the modified MgAlCO$_3$ LDH compound in the drilling fluid of Example 1. Thus, the drilling fluid of Example 1 required less energy to circulate the drilling fluid than commercially available rheology modifiers found in place of the modified MgAlCO$_3$ LDH compound, for example Bentone 42 found in the Comparative Fluid.

The oil-based drilling fluid of Example 1 had a fluid loss at 250° F. of 5.2 mL (doubled). The Comparative Fluid had a fluid loss of 6.8 mL. The decrease of fluid loss was attributed to the rheology modifier, modified MgAlCO$_3$ LDH. Thus, the drilling fluids otherwise identical, but containing commercially available rheology modifier, did not have a stable emulsion or the drilling fluid separated into separate water and oil layers.

Further evidence of emulsion stability can be provided in the electrical stability data. The drilling fluid of Example 1 had electrical stability properties of 1422 V before hot rolling and 1212 V after hot rolling. The electrical stability of the Comparative Fluid was 1173 V before hot rolling and 402 V after hot rolling. Additionally, the difference in electrical stability between the drilling fluid of Example 1 and the Comparative Fluid is more than 800 V. This would indicate that the drilling fluid of Example 1 is more thermally stable than the Comparative Fluid. The increase in electrical stability before and after hot rolling and a greater thermal stability can be attributed to the modified MgAlCO$_3$ LDH compound. Thus, the drilling fluid containing the modified MgAlCO$_3$ LDH had a better emulsion stability and was more thermally stable than the Comparative Fluid, containing a commercial rheology modified but otherwise identical.

The present disclosure is directed to at least one of the following aspects.

Aspect 1: An oil-based drilling fluid comprising: a base oil continuous phase, wherein the base oil continuous phase comprises a base oil; an aqueous dispersed phase; and at least one rheology modifier comprising a modified magnesium/aluminum carbonate layered-double hydroxide (Mg/Al—CO$_3$ LDH) compound.

Aspect 2: The oil-based drilling fluid of Aspect 1, in which the magnesium/aluminum carbonate layered-double hydroxide compound comprises a molar ratio of 2 to 1 of magnesium to aluminum.

Aspect 3: The oil-based drilling fluid of any of Aspects 1 or 2, in which the magnesium/aluminum carbonate layered-double hydroxide (Mg/Al—CO$_3$ LDH) compound is prepared by: mixing a magnesium compound, an aluminum compound, and an aqueous solution to form an initial solution; adding at least one basic compound to the initial solution to form a reaction solution, the at least one basic compound comprising a carbonate salt or a bicarbonate salt; optionally adjusting the pH with a solution comprising; and heating the reaction solution at a reaction temperature for a reaction time to form the Mg/Al—CO$_3$ LDH compound.

Aspect 4: The oil-based drilling fluid of any of the preceding aspects, in which the base oil is chosen from a base oil chosen from a synthetic oil comprising an ester or olefin, a diesel oil, or a mineral oil, in which the synthetic oil, the diesel oil, or the mineral oil comprises hydrocarbons chosen from n-paraffins, iso-paraffins, cyclic alkanes, branched alkanes, or mixtures thereof.

Aspect 5: The oil-based drilling fluid of any of the preceding aspects, having an oil-to-water ratio by volume of from 50:50 to 95:5.

Aspect 6: The oil-based drilling fluid of any of the preceding aspects, further comprising at least one additive chosen from emulsifiers, wetting agents, alkalinity control agents, fluid-loss control agents, suspending agents, weight-adjusting agents, density-adjusting agents, or combinations thereof.

Aspect 7: The oil-based drilling fluid of any of the preceding aspects, further comprising at least one emulsifier, at least one wetting agent, at least one alkalinity control agent, at least one fluid-loss control agent, at least one suspending agent, and at least one density adjusting agent.

Aspect 8: The oil-based drilling fluid of any of the preceding aspects, in which the aqueous dispersed phase contains a brine chosen from calcium chloride, calcium bromide, sodium chloride, sodium bromide, and combinations thereof.

Aspect 9: The oil-based drilling fluid of any of the preceding aspects, comprising from 0.1 wt. % to 1.0 wt. % rheology modifier, based on the total weight of the oil-based drilling fluid.

Aspect 10: The oil-based drilling fluid of any of the preceding aspects, comprising, based on the total weight of the oil-based drilling fluid from 10 wt. % to 17 wt. % base oil.

Aspect 11: The oil-based drilling fluid of any of the preceding aspects, comprising, based on the total weight of the oil-based drilling fluid from 0.5 wt. % to 2.0 wt. % emulsifier.

Aspect 12: The oil-based drilling fluid of any of the preceding aspects, comprising, based on the total weight of the oil-based drilling fluid from 0.2 wt. % to 0.6 wt. % wetting agent.

Aspect 13: The oil-based drilling fluid of any of the preceding aspects, comprising, based on the total weight of the oil-based drilling fluid from 0.2 wt. % to 1.0 wt. % rheology modifier.

Aspect 14: The oil-based drilling fluid of any of the preceding aspects, comprising, based on the total weight of the oil-based drilling fluid from 0.5 wt. % to 1.5 wt. % fluid-loss control additive.

Aspect 15: The oil-based drilling fluid of any of the preceding aspects, comprising, based on the total weight of the oil-based drilling fluid from 2.5 wt. % to 5.0 wt. % brine solution.

Aspect 16: The oil-based drilling fluid of any of the preceding aspects, comprising, based on the total weight of the oil-based drilling fluid from 65.0 wt. % to 78.0 wt. % weighting additive.

Aspect 17: The oil-based drilling fluid of any of the preceding aspects, in which the oil-based drilling fluid exhibits physical characteristics suitable for use of the oil-based drilling fluid under high-pressure high-temperature conditions during drilling operations.

Aspect 18: The oil-based drilling fluid of any of the preceding aspects, in which high-pressure high-temperature conditions during drilling operations comprise a wellbore pressure greater than 10,000 psi and a wellbore temperature greater than 300° F.

Aspect 19: A method for preparing an oil-based drilling fluid, the method comprising: mixing a base oil, at least one emulsifier, and at least one wetting agent to form a base oil continuous phase; and adding at least one rheology modifier into the base oil continuous phase to form an oil-based drilling fluid, in which the at least one rheology modifier comprises a modified magnesium/aluminum carbonate layered-double hydroxide compound.

Aspect 20: The method of Aspect 19, in which the oil-based drilling fluid further comprises at least one additive chosen from a fluid-loss control additive, a brine solution, at least one weighting additive, a rheology modifier, and combinations thereof.

Aspect 21: The method of any of Aspects 19 or 20, in which the modified magnesium/aluminum carbonate (Mg/Al—$CO_3$) compound is prepared by: mixing a magnesium compound, an aluminum compound, and an aqueous solution to form an initial solution; adding at least one basic compound to the initial solution to form a reaction solution, the at least one basic compound comprising a carbonate salt or a bicarbonate salt; optionally adjusting the pH with a solution comprising; and heating the reaction solution at a reaction temperature for a reaction time to form the Mg/Al—$CO_3$ LDH compound.

Aspect 22: The method of any of Aspects 19 to 21, in which the base oil continuous phase comprises a base oil chosen from a synthetic oil comprising an ester or olefin, a diesel oil, or a mineral oil, in which the synthetic oil, the diesel oil, or the mineral oil comprises hydrocarbons chosen from n-paraffins, iso-paraffins, cyclic alkanes, branched alkanes, or mixtures thereof.

Aspect 23: The method of any of Aspects 19 to 22, comprising from 0.1 wt. % to 1.0 wt. % rheology modifier, based on the total weight of the oil-based drilling fluid.

Aspect 24: The method of any of Aspects 19 to 23, in which the brine solution is chosen from calcium chloride, calcium bromide, sodium chloride, sodium bromide, and combinations thereof.

Aspect 25: The method of any of Aspects 19 to 24, comprising from 10 wt. % to 20 wt. % base oil, based on the total weight of the oil-based drilling fluid.

Aspect 26: The method of any of Aspects 19 to 25, comprising from 0.1 wt. % to 2.0 wt. % emulsifier, based on the total weight of the oil-based drilling fluid.

Aspect 27: The method of any of Aspects 19 to 26, comprising from 0.1 wt. % to 2.0 wt. % wetting agent, based on the total weight of the oil-based drilling fluid.

Aspect 28: The method of any of Aspects 19 to 27, comprising from 0.5 wt. % to 3.0 wt. % fluid-loss control additive, based on the total weight of the oil-based drilling fluid.

Aspect 29: The method of any of Aspects 19 to 28, comprising from 2.0 wt. % to 6.0 wt. % brine solution, based on the total weight of the oil-based drilling fluid.

Aspect 30: The method of any of Aspects 19 to 29, comprising from 20 wt. % to 80 wt. % weighting additive, based on the total weight of the oil-based drilling fluid.

Aspect 31: A method for drilling in a subterranean formation under high-pressure high-temperature conditions, the method comprising: providing or using in the drilling of a wellbore into the subterranean formation an oil-based drilling fluid according to any of Aspects 1 to 18.

Aspect 32: The method of Aspect 31, in which high-pressure high-temperature conditions comprise a wellbore pressure greater than 10,000 psi and a wellbore temperature greater than 300° F.

Aspect 33: The method of any of Aspects 31 or 32, in which the oil-based drilling fluid with the rheology modifier, under high-pressure high-temperature conditions, has lower viscosity, compared to a drilling fluid having an identical specific gravity and oil-to-water ratio and identical ingredients in identical proportions to the oil-based drilling fluid but lacking the rheology modifier.

Aspect 34: The method of any of Aspects 31 to 33, in which the oil-based drilling fluid with the rheology modifier, under high-pressure high-temperature conditions, has a lower fluid loss, compared to a drilling fluid having an identical specific gravity and oil-to-water ratio and identical ingredients in identical proportions to the oil-based drilling fluid but lacking the rheology modifier.

Aspect 35: The method of any of Aspects 31 to 34, in which the oil-based drilling fluid with the rheology modifier, under high-pressure high-temperature conditions, has higher electrical stability, compared to a drilling fluid having an identical specific gravity and oil-to-water ratio and identical ingredients in identical proportions to the oil-based drilling fluid but lacking the rheology modifier.

Aspect 36: A method of drilling a subterranean well, the method comprising: operating a drill in a wellbore in the presence of an oil-based drilling fluid comprising: a base oil; at least one additive chosen from an emulsifier, a weighting material, a fluid-loss additive, a viscosifiers, or an alkali compound; and from 0.1 wt. % to 1 wt. %, based on the total weight of the drilling fluid, of a magnesium/aluminum carbonate layered double hydroxide compound.

Aspect 37: The method of Aspect 36, further comprising adding the magnesium/aluminum carbonate layered double hydroxide compound to the drilling fluid before or during operating the drill in the wellbore.

Aspect 38: The method of any of Aspects 35 to 37, in which the compound having magnesium/aluminum carbonate layered double hydroxide compound is added to the drilling fluid during operation of the drill in the wellbore.

Aspect 39: The method of any of Aspects 35 to 38, in which the drilling fluid comprises an electrical stability of from 1200 V to 1500 V and a 10-second gel strength of from 1 lbf/100 ft$^2$ to 10 lbf/100 ft$^2$ as determined according to test methods provided in API RP 13B-1.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of drilling a subterranean well, the method comprising:
   operating a drill in a wellbore in the presence of an oil-based drilling fluid under high-pressure high-temperature conditions comprising a wellbore pressure greater than 10,000 psi and a wellbore temperature greater than 300° F., the oil-based drilling fluid comprising:
   from 14 wt. % to 16 wt. % base oil continuous phase, based on the total weight of the oil-based drilling fluid, wherein the base oil continuous phase comprises a base oil;
   from 0.75 wt. % to 2 wt. % emulsifier, based on the total weight of the oil-based drilling fluid;
   from 0.2 wt. % to 0.6 wt. % wetting agent, based on the total weight of the oil-based drilling fluid;
   from 0.6 wt. % to 0.8 wt. % pH adjuster, based on the total weight of the oil-based drilling fluid;
   from 2 wt. % to 5 wt. % aqueous dispersed phase, based on the total weight of the oil-based drilling fluid;
   from 0.1 wt. % to 0.5 wt. % rheology modifier comprising a modified magnesium/aluminum carbonate layered-double hydroxide (Mg/Al—CO$_3$ LDH) compound, based on the total weight of the oil-based drilling fluid; and
   from 70 wt. % to 80 wt. % weighting material based on the total weight of the oil-based drilling fluid.

2. The method of claim 1, further comprising adding the magnesium/aluminum carbonate layered double hydroxide compound to the drilling fluid before or during operating the drill in the wellbore.

3. The method of claim 1, in which the base oil is a synthetic oil comprising an ester or an olefin.

4. The method of claim 1, in which the emulsifier comprises surfactants, detergents, lignosulfonates, lignitic compounds, materials derived from tall oil fatty acids, or combinations thereof.

5. The method of claim 1, in which the wetting agent comprises fatty acids, organic phosphate esters, modified imidazolines, amidoamines, alkyl aromatic sulfates, sulfonates, or combinations thereof.

6. The method of claim 1, in which the pH adjuster comprises lime.

7. The method of claim 1, in which the oil-based drilling fluid has a pH of from 9 to 10.5.

8. The method of claim 1, in which the aqueous dispersed phase comprises fresh water and a calcium chloride brine.

9. The method of claim 8, in which the oil-based drilling fluid comprises from 2.0 wt. % to 6.0 wt. % of the calcium chloride brine.

10. The method of claim 1, in which the Mg/Al—CO$_3$ LDH compound has an empirical formula $[Mg_{1-x}Al_x(OH)_2](CO_3)_{x/3} \cdot mH_2O$, where x is from 0.1 to 0.4 and m is from 0.1 to 0.6.

11. The method of claim 1, in which the weighting material comprises barite.

12. The method of claim 1, in which:
   the base oil is a synthetic oil comprising an ester or an olefin;
   the emulsifier comprises surfactants, detergents, lignosulfonates, lignitic compounds, materials derived from tall oil fatty acids, or combinations thereof;
   the wetting agent comprises fatty acids, organic phosphate esters, modified imidazolines, amidoamines, alkyl aromatic sulfates, sulfonates, or combinations thereof;
   the pH adjuster comprises lime;
   the oil-based drilling fluid has a pH of from 9 to 10.5;
   the aqueous dispersed phase comprises fresh water and a calcium chloride brine;
   the oil-based drilling fluid comprises from 2.0 wt. % to 6.0 wt. % of the calcium chloride brine;
   the Mg/Al—CO$_3$ LDH compound has an empirical formula $[Mg_{1-x}Al_x(OH)_2](CO_3)_{x/3} \cdot mH_2O$, where x is from 0.1 to 0.4 and m is from 0.1 to 0.6; and
   the weighting material comprises barite.

* * * * *